United States Patent [19]

Bedis

[11] Patent Number: 4,738,494
[45] Date of Patent: Apr. 19, 1988

[54] WEAR PLATE FOR IDLER SLIDE MOUNTING

[75] Inventor: Michael Bedis, Dubuque, Iowa

[73] Assignee: Deere & Company, Moline, Ill.

[21] Appl. No.: 349,439

[22] Filed: Feb. 16, 1982

[51] Int. Cl.$^4$ .............................................. B62D 55/30
[52] U.S. Cl. ........................................ 305/31; 305/10
[58] Field of Search ............................. 305/10, 31, 32; 384/420, 423; 308/3 R; 219/98; 411/171

[56] References Cited

U.S. PATENT DOCUMENTS

| | | | |
|---|---|---|---|
| 2,413,370 | 12/1946 | Palmer | 411/171 X |
| 2,511,098 | 6/1950 | Bridwell et al. | 305/9 |
| 2,959,451 | 11/1960 | Weber | 305/10 |
| 3,323,841 | 6/1967 | Mason | 305/31 X |
| 3,332,725 | 7/1967 | Reinsma | 305/31 X |
| 3,415,974 | 12/1968 | Graham | 219/98 X |
| 3,779,615 | 12/1973 | Kennicutt et al. | 305/10 |
| 3,841,715 | 10/1974 | Comer, Jr. et al. | 305/10 |
| 3,907,382 | 9/1975 | Kessinger, Jr. | 305/10 |

Primary Examiner—David A. Scherbel

[57] ABSTRACT

Wear plates are provided at the interface between an idler support and a track frame of a track laying tractor. The wear plates have a pair of threaded fasteners stud-welded to one side thereof and received in slots provided in wear plate supporting structures forming part of the idler support. Nuts and washers are received on the fasteners and hold the wear plates in place.

4 Claims, 2 Drawing Sheets

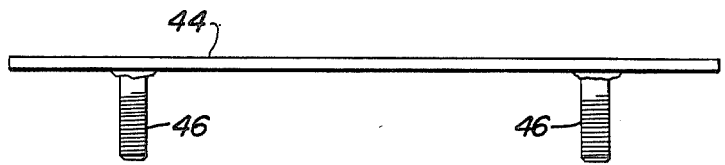
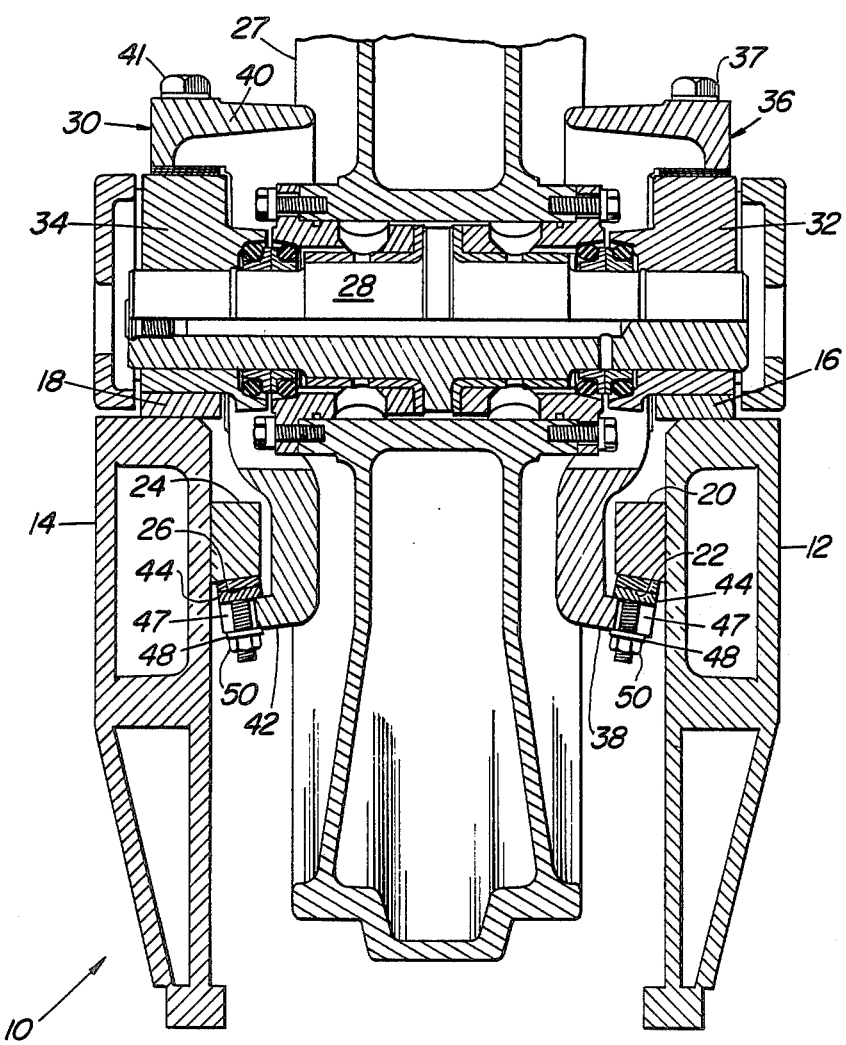

WEAR PLATE FOR IDLER SLIDE MOUNTING

BACKGROUND OF THE INVENTION

The present invention relates to mountings for permitting fore-and-aft sliding movement of an idler for a track laying tractor track and more specifically relates to wear plates for use in such mountings.

It is known to support idlers for fore-and-aft sliding movement along track frames and to provide replaceable wear plates on one or the other of the idler support and the track frame at the area of sliding contact between the support and frame. Heretofore, these wear plates have been secured in place by welding, by bolts received in threaded holes provided in the wear plate or by other types of fasteners inserted through holes provided in the plates. Welding the wear plates in place is not very satisfactory from the standpoint of ease in replacement, and the idea of securing the wear plate in place by using bolts threaded into holes provided in the wear plates is not only relatively expensive due to drilling and tapping procedures but also is not satisfactory from the standpoint of economy in the use of material, since the wear plates must be made extra thick in order for the thread length to be sufficient for adequate securement. Other methods of securement requiring holes to be provided in the wear plates for receiving fasteners are either unsatisfactory from the standpoint of economy of material as the wear plates must be made long enough to dispose the holes out of the sliding range or the holes, if within the sliding range, result in accelerating the wear of the plates.

SUMMARY OF THE INVENTION

According to the present invention, there is provided an improved wear plate mounting.

An object of the invention is to provide an economical wear plate which is mounted for easy replacement and has a relatively good wear life.

A more specific object of the invention is to provide a wear plate having threaded fasteners stud-welded to one side thereof.

These and other objects of the invention will become apparent from a reading of the ensuing description together with the appended drawing.

BRIEF DESCRIPTION OF THE DRAWING

FIG. 2 is a vertical sectional view taken along line 2—2 of FIG. 1.

FIG. 3 is a side view of the wear plate.

DESCRIPTION OF THE PREFERRED EMBODIMENT

Figure 1:
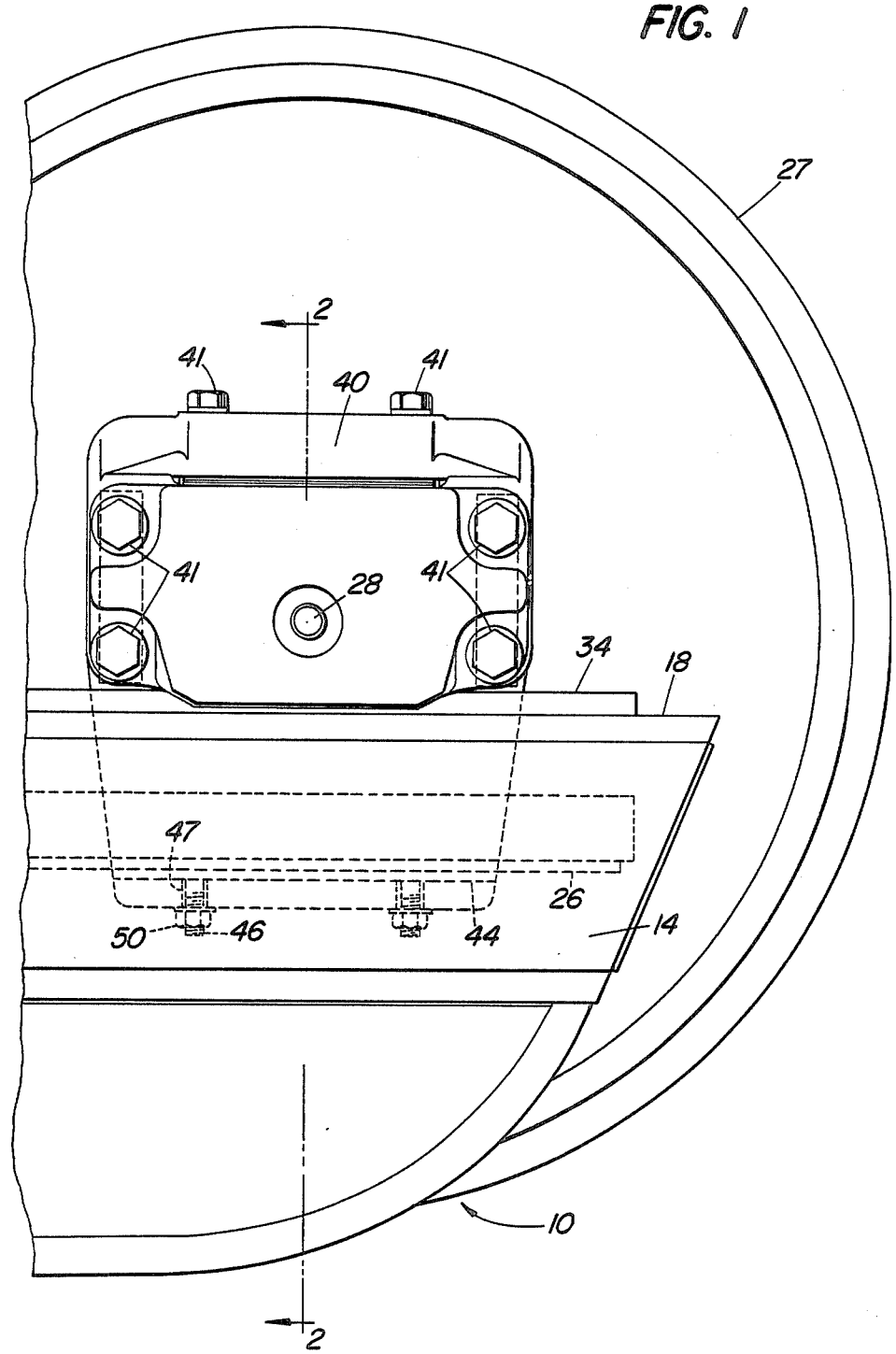
FIG. 1 is a side elevational view of an idler and support therefor mounted on a track frame for slidable movement therealong.

Referring now to FIGS. 1 and 2, therein is shown a forward end portion of a track frame 10 of a track laying tractor. The frame 10, as viewed in FIG. 3, includes right- and left-hand beams 12 and 14, respectively. The beams 12 and 14 extend fore-and-aft in parallel relationship to each other. The beams 12 and 14 include flat tops to which flat guide strips or bars 16 and 18 are respectively secured. The left-hand side of the beam 12 is formed in part by a fore-and-aft extending bar 20 located at a level below the surface 16 and carrying a downwardly facing flat bearing plate 22 while the right-hand side of the beam 14 is similarly formed in part by a bar 24 carrying a downwardly facing flat bearing plate 26.

An idler 27 is rotatably mounted on a shaft 28 which forms part of a support 30 that is mounted so as to bridge and be slidable along the beams 12 and 14. Specifically, the support 30 includes right- and left-hand members 32 and 34 respectively fixed on the opposite end of the shaft 28 and disposed in sliding engagement with the guide strips 16 and 18, respectively. The support 30 includes a right-hand removable wear plate supporting structure 36 which is secured to the member 32 by a plurality of fasteners 37 (only one shown) and extends downwardly beside the bar 20 and has a lower end 38 which is disposed beneath the bearing strip 22. The support 30 includes a left-hand removable wear plate supporting structure 40 which is secured to the member 34 by a plurality of fasteners 41 and extends downwardly beside the bar 24 and has a lower end 42 which is disposed beneath the plate 26.

Respectively mounted on each of the lower ends of the structures 36 and 40 is a wear plate 44 (see FIG. 3) having a pair of threaded fasteners 46 stud-welded to the lower surface thereof at longitudinally spaced locations therealong. The fasteners 46 are received in slots 47 provided in the lower ends 38 and 42 of the supporting structures 36 and 40, and received on the lower ends of each of the fasteners are a washer 48 and nut 50 which operate to hold the wear plates 44 in place with the entire upper surfaces thereof in bearing engagement with the bearing plates 22 and 26.

Thus, it will be appreciated that the wear plates 44 may be easily replaced when worn by first removing the fasteners 37 and 41 to release the supporting structures 36 and 40 then forcing the structures towards each other until the wear plates 44 clear the plates 22 and 26. The nuts 50 can then be loosened to release the wear plates 44 and permit replacements to be reinstalled in the reverse order of operation.

While the wear plates 44 are here shown as connected to the support 28, it is to be understood that for other configurations of track frames and idler supports it might be desirable to connect the plates 44 to the track frame. Also, it is to be understood that holes may be provided for receiving the fasteners 46 instead of the slots 47.

I claim:

1. In a combination including an idler wheel support mounted for fore-and-aft movement on a track frame with one of the support and frame having a wear plate in the form of a metal bar fixed thereto and engaged by a slide surface of the other of the support and frame, the improvement comprising: said wear plate having a first surface having its entire area engaged with said slide surface and having an opposite second suface; at least two threaded fasteners stud-welded to said second surface at spaced locations therealong; said one of the support and frame being provided with opening means receiving said fasteners; and a nut being received on each fastener and holding the wear plate in place.

2. The combination defined in claim 1 wherein the wear plate is secured to the idler support.

3. The combination defined in claim 2 wherein the idler support includes a horizontal flange extending fore-and-aft below and coextensive with the slide surface of the track frame; and said wear plate being positioned atop the flange.

4. The combination defined in claim 1 wherein said opening means comprises a slot for receiving each fastener.

* * * * *